United States Patent [19]
Wheatley et al.

[11] Patent Number: 5,750,936
[45] Date of Patent: May 12, 1998

[54] PRINTED WIRING BOARD HARDWARE CAPTIVATION METHOD

[75] Inventors: William E. Wheatley, Rochester; Robert James Wilson, Jr., Macedon, both of N.Y.

[73] Assignee: Harris Corporation, Melbourne, Fla.

[21] Appl. No.: 739,221

[22] Filed: Oct. 29, 1996

[51] Int. Cl.[6] .................................................. F16B 13/06
[52] U.S. Cl. ......................................... 174/138 G; 361/759
[58] Field of Search ........................... 174/138 D, 138 G, 174/138 R, 159, 166 R; 411/107; 439/741, 751, 629; 361/747, 759

[56] References Cited

U.S. PATENT DOCUMENTS

| | | |
|---|---|---|
| 4,523,883 | 6/1985 | Peterson et al. .................. 411/171 |
| 4,726,722 | 2/1988 | Wollar ................................ 411/32 |

Primary Examiner—Kristine L. Kincaid
Assistant Examiner—Joseph Waks
Attorney, Agent, or Firm—Rogers & Killeen

[57] ABSTRACT

A printed wiring board (PWB) is attached to a PWB holder with mounting hardware which includes a washer having a first annular surface with a first external diameter for insertion into a mounting hole in the PWB and a second annular surface with a larger second external diameter. The two external diameters form an annular shoulder on an exterior side of the washer that extends between the first and second external diameters for soldering the washer to the PWB. The washer includes a resilient flange interior to its opening. A screw for mounting the PWB is inserted through the opening and has a screw head larger than a diameter of the opening and a second end with an external diameter smaller than the diameter of the opening, but larger than an internal diameter of the flange, so that the screw is held by the washer when the second end is forcibly inserted through the resiliently flanged opening.

14 Claims, 1 Drawing Sheet

PRINTED WIRING BOARD HARDWARE CAPTIVATION METHOD

BACKGROUND OF THE INVENTION

The present invention relates to attachment methods and hardware, and more particularly to a method and hardware for attaching a printed wiring board (PWB) to its holder.

Electronic components are typically mounted on a wiring board which may include printed circuitry (a PWB, also known as a printed circuit board and the like). PWB is used herein to refer to any such board for electronic components, printed or not. The PWBs are mounted on a holder which is adapted to be connected to the components on the PWB and may include fans or the like for cooling the components. The hardware for mounting the PWB on the holder typically maintains the PWB in a specific spatial relationship to the holder and to other PWBs to facilitate cooling.

The hardware for mounting the PWB on its holder is desirably captured by the PWB. That is, the hardware is desirably attached to the PWB so it is not separated from the PWB during handling. The prior art hardware for mounting PWBs is labor-intensive, typically requiring manual assembly, which adds to the cost and time for manufacturing PWBs. For example, press-fit self-clinching hardware and stamped sheetmetal clips are presently in use.

Accordingly, it is an object of the present invention to provide a novel method and hardware for mounting a PWB on its holder which does not require manual assembly, thereby obviating the problems of the prior art.

It is another object of the present invention to provide novel mounting hardware for a PWB which includes a washer with a shoulder for attachment to the PWB and a resiliently flanged interior for receiving a mounting device which is held by the washer with the flanges.

It is yet another object of the present invention to provide novel hardware for mounting a PWB; the hardware including: (a) a washer having different diameters on opposing annular surfaces to form an annular shoulder on a side of the washer which is soldered around a PWB mounting hole and having a resilient flange on the interior annular surface of the washer, and (b) a screw for insertion through the interior annular surface of the washer, the screw having a head with an external diameter larger than a diameter of the interior annular surface of the washer and an opposite end with an external diameter smaller than the diameter of the interior annular surface of the washer and larger than an internal diameter of the flange, so that the screw is held by the washer when the opposite end of the screw is forcibly inserted through the resiliently flanged interior annular surface of the washer.

It is still another object of the present invention to provide a novel electronic circuit assembly which includes a PWB and its mounting hardware, described above.

It is a further object of the present invention to provide a novel method of mounting a PWB on its holder in which a washer with a shoulder is soldered to the PWB around a mounting hole and a mounting device is inserted through the washer and held by resilient flanges on an interior annular surface of the washer.

It is yet a further object of the present invention to provide a novel method of holding a piece of mounting hardware on a wiring board by making a hardware mounting hole of a first internal diameter through a wiring board, providing a washer for holding a piece of mounting hardware, affixing the washer to the wiring board on the mounting hole, and forcibly inserting a piece of mounting hardware through a resiliently flanged opening of the washer so that the piece of mounting hardware is held captive on the wiring board by the flange.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
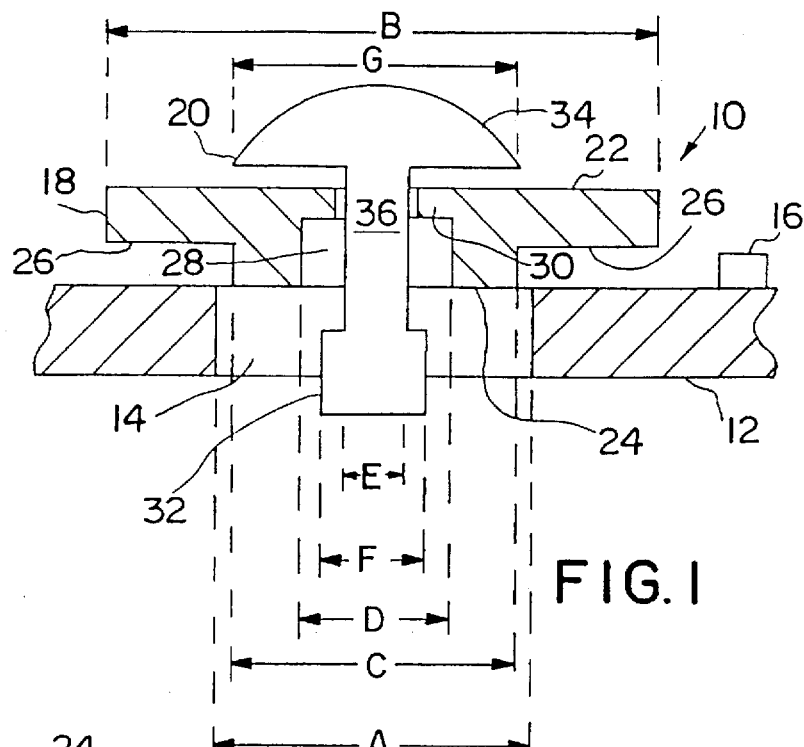
FIG. 1 is a partial vertical cross section of an embodiment of the present invention.

With reference now to FIG. 1, an embodiment of the present invention may include mounting hardware 10 for attachment to a PWB 12 which has a mounting hole 14 therethrough with an internal diameter A and which may have electronic components 16 thereon. Mounting hardware 10 may include a washer 18 and a mounting device 20 for attaching the PWB to its holder.

Figure 2:
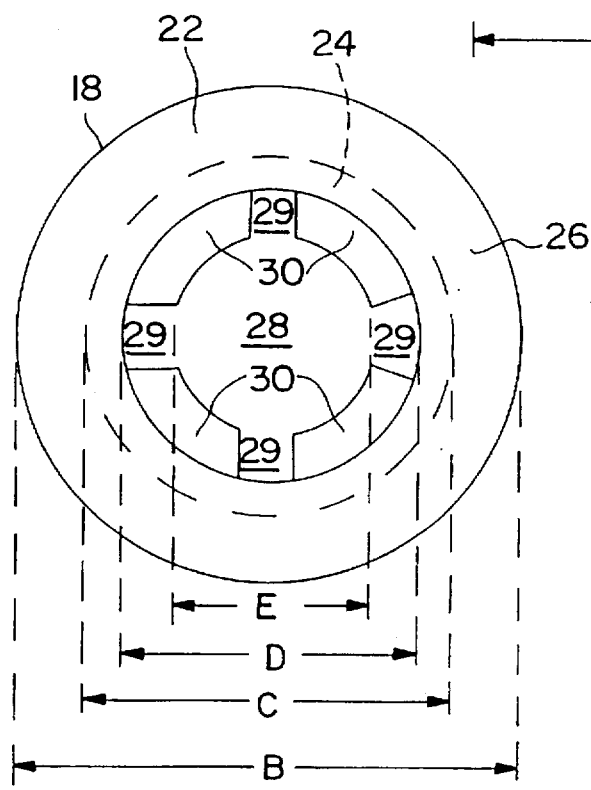
FIG. 2 is a plan view of a washer of the present invention.

With reference to FIGS. 1 and 2, washer 18 may have an annular surface 22 with an external diameter B and an annular surface 24 with an external diameter C, thereby forming an annular shoulder 26 which extends between diameters B and C. Diameter C is no larger than diameter A so that surface 24 can be inserted into mounting hole 14. Shoulder 26 desirably extends over PWB 12 a distance sufficient to permit affixation of shoulder 26 to PWB 12, such as by soldering. Washer 18 has an interior annular opening 28 with internal diameter D.

Figure 3:
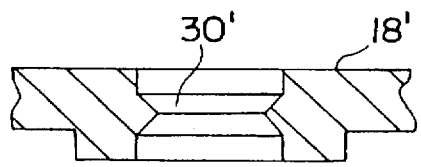
FIG. 3 is a partial vertical cross section of another embodiment of a washer of the present invention showing an alternative flange.

A resilient member 30, such as a flange, with internal diameter E may be provided on the interior surface of opening 28 for holding device 20, as will be discussed below. Member 30 is desirably sufficiently resilient so that when it is deformed it returns to, or almost to, its original size, at least for the first deformation. Member 30 may take various shapes, including the square-ended shape shown in FIG. 1, with slots 29 such as shown in FIG. 2 to facilitate its resiliency (the number and size of slots 29 may be varied as appropriate), and the angled member 30' shown for washer 18' in FIG. 3, with or without slots. Other embodiments of member 30 may be used which are sufficiently resilient to operate as discussed below.

Shoulder 26 may be affixed to PWB 12 by conventional attachment techniques, including soldering, which may use conventional component placement tools typically found in facilities for fabricating PWBs.

Mounting device 20 includes a first end 32 for insertion through opening 28 of washer 18, and a second end 34 which sits atop washer 18. First end 32 may have an external diameter F which is smaller than diameter D and larger than diameter E so that first end 32 can be inserted through opening 28 by overcoming the resistive pressure of resilient member 30, deforming member 30 to permit passage of first end 32 therethrough. The portion 36 between ends 32 and 34 may have a diameter smaller than diameter E so that mounting device 20 is free to move vertically (in the orientation of FIG. 1) in relation to washer 18. Second end 34 may have diameter G which is larger than diameter D so that end 34 cannot go through opening 28. First end 32 may take various shapes as appropriate for attachment of PWB 12 to its holder (attachment methods being known in the art). Second end 34 may also take various shapes as befits the need. The figures herein include exemplary shapes, although the invention is not so limited.

Figure 4:
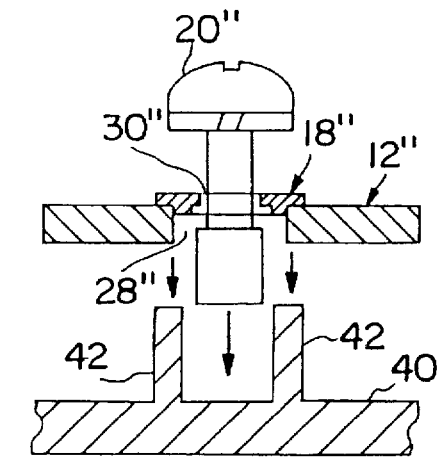
FIG. 4 is a partial vertical cross section showing an embodiment of the present invention in relation to a holder for a PWB.

With reference now to FIG. 4, when washer 18" is affixed to PWB 12" and mounting device 20" is inserted into opening 28" of washer 18", device 20" is captured by resilient member 30" so that device 20" and washer 18" cannot be separated (unless a force similar to that needed to insert device 20" is applied to separate the two) and so that the combination of washer 18" and device 20" is captured by PWB 12". Mounting device 20" is free to move so that it may be manipulated to attach it to a holder 40 for PWB 12". Holder 40 may include sleeve 42 or another mounting receptacle appropriate for receiving mounting device 20".

The embodiments shown relate to washers and mounting devices which have circular cross sections. The invention is also applicable to other shapes, although circular shapes are preferred.

A washer for the present invention may be manufactured by chemically milling sheetmetal, such as brass or other acceptable metals, using conventional tools. For example, an 18 inch by 18 inch sheet of 0.032 inch thick brass can be used to make 1,500 to 1,800 washers. With the washers still being held in the 18×18 blank, the blank may be provided to a device for removing the washers and putting them on tape and reel for use by automatic component placement machines. Other methods and materials may also be used to fabricate the washer, such as screw machined fabrication for metal washers and injection molding for plastic washers which may be glued, rather than soldered to the PWB.

As will be appreciated, the present invention may be entirely automatic—fabrication of the washers, attachment of the washers to a PWB, and insertion of a mounting device through the washers which are attached to the PWB—thereby reducing labor, material and fabrication costs. Further, the space taken by the mounting hardware and associated mounting hole may be less than previously needed, thereby improving PWB space utilization.

While preferred embodiments of the present invention have been described, it is to be understood that the embodiments described are illustrative only, and the scope of the invention is to be defined solely by the appended claims when accorded a full range of equivalence, many variations and modifications naturally occurring to those of skill in the art from a perusal hereof.

What is claimed is:

1. Hardware for mounting a printed wiring board (PWB) on a holder, said hardware comprising:

a washer having a first annular surface with a first external diameter, a second annular surface with a second external diameter larger than said first external diameter, an annular shoulder on an exterior side of said washer that extends between said first and second external diameters for attaching said washer to a PWB, and a resilient flange on an interior annular surface of said washer; and a mounting device for insertion through the interior annular surface of said washer, said mounting device having a first end with an external diameter larger than a diameter of the interior annular surface of said washer and a second end with an external diameter smaller than the diameter of the interior annular surface of said washer and larger than an internal diameter of said flange, whereby said mounting device is held by said washer between said first and second ends of said mounting device when said second end is forcibly inserted through the interior annular surface of said washer.

2. The hardware of claim 1 wherein said flange comprises slots for facilitating its resilience.

3. The hardware of claim 1 wherein said mounting device is a screw, said first end is a head of said screw and said second end is a component for attachment to a holder for the PWB.

4. An electronic circuit assembly with hardware for mounting the assembly in a holder, comprising:

a wiring board with a mounting hole with a first internal diameter;

a washer having (a) a first annular surface with a first external diameter no larger than the first internal diameter of said mounting hole for insertion into said mounting hole, (b) a second annular surface with a second external diameter larger than the first internal diameter, (c) an annular shoulder on an exterior side of said washer that extends between said first and second external diameters for affixing said washer on said board, and (d) a resilient flange on an interior annular surface of said washer; and a mounting device for insertion through the interior annular surface of said washer, said mounting device having ends with external diameters larger than an internal diameter of said flange and a portion between said ends with an external diameter no larger than the internal diameter of said flange.

5. The assembly of claim 4 wherein said shoulder is soldered to said board so that said shoulder surrounds said mounting hole.

6. The assembly of claim 5 wherein said mounting device comprises a screw which is inserted through the interior annular surface of said washer.

7. The assembly of claim 4 wherein a first one of said ends comprises an external diameter larger than the internal diameter of the interior annular surface of said washer and a second one of said ends comprises an external diameter smaller than an internal diameter of the interior annular surface of said washer.

8. The assembly of claim 7 wherein said mounting device comprises a screw, said first one of said ends is a head of said screw and said second one of said ends is a portion for attachment to a holder for said wiring board.

9. The assembly of claim 7 wherein said flange comprises slots for facilitating its resilience.

10. A method of holding a piece of mounting hardware on a wiring board comprising the steps of:

(a) making a hardware mounting hole of a first internal diameter through a wiring board;

(b) providing a washer for holding a piece of mounting hardware, the washer having a first annular surface with a first external diameter no larger than the first internal diameter and a second annular surface with a second external diameter larger than the first internal diameter to form an annular shoulder on an exterior side of the washer that extends between the first and second external diameters, the washer also having a resilient flange on an interior annular surface;

(c) affixing the washer to the wiring board on the mounting hole with the first annular surface of said washer inside the mounting hole;

(d) providing said piece of mounting hardware which has a first end with external diameter larger than an internal diameter of the interior annular surface and a second end with an external diameter smaller than the internal diameter of the interior annular surface and larger than an internal diameter of the flange, and a portion between the two ends with an external diameter smaller than the internal diameter of the flange; and (e) pressing the second end of the piece of mounting hardware through the washer by overcoming resistance provided by the flange so that the piece of mounting hardware is held captive on the wiring board by the flange.

11. The method of claim 10 further comprising the step of providing the flange with slots to facilitate its resilience.

12. The method of claim 10 wherein the step of affixing the washer comprises the step of soldering the shoulder to the wiring board.

13. The method of claim 10 wherein the step of providing the washer comprises the step of creating the washer by chemically milling sheetmetal.

14. The method of claim 10 wherein the piece of mounting hardware is a screw, the first end is a head of said screw and the second end is a component for attachment to a holder for the wiring board.

* * * * *